United States Patent Office 3,701,769
Patented Oct. 31, 1972

3,701,769
N-(p-AMINOPHENYL) PYRROLIDINE CONTAINING MONOAZO DYES
Arnold F. Plue, Rensselaer, N.Y., and Leon Katz, Springfield, N.J., assignors to GAF Corporation, New York, N.Y.
No Drawing. Filed May 1, 1970, Ser. No. 33,920
Int. Cl. C09b 29/00
U.S. Cl. 260—152                         3 Claims

ABSTRACT OF THE DISCLOSURE

Process for the preparation of N-(p-aminophenyl) pyrrolidines by coupling a diazotized aminobenzenesulfo acid with the pyrrolidino benzene corresponding to the desired product, and reducing the resulting azo compound to the corresponding amino derivatives. The intermediate azo compounds are useful as dyestuffs for polyamide fiber, and the N-(p-aminophenyl) pyrrolidines yield, on diazotization of the p-amino groups and conversion of the resulting diazonium compound to complex diazonium double salts, valuable sensitizers for light-sensitive diazotype copying materials.

---

This invention relates to a new process for preparation of N-(p-aminophenyl) pyrrolidines wherein the aminophenyl radical can be otherwise unsubstituted, or may be substituted in 2- and/or 5-position by halogen (Cl, Br) or by methyl groups or lower alkoxy groups of 1–4 carbon atoms. The invention also relates to novel azo compounds which are formed as intermediates in the aforesaid process.

The resulting aminophenyl pyrrolidines are valuable intermediates for the preparation of light-sensitive diazonium compounds for sensitizing diazotype copying materials, yielding black or bluish-black colorations with azo couplers conventionally employed in diazotype copying.

The preparation of aminophenyl pyrrolidines such as those of the present invention hitherto involve nitration of the corresponding N-phenyl pyrrolidines and reduction of the nitro or nitroso group to an amino group. Such processes are relatively unsatisfactory since decomposition and side reactions occur in the nitration step, causing losses in yield and difficulties in purifying the product.

It is an object of this invention to provide a procedure for preparing the aforesaid N-(p-aminophenyl) pyrrolidines characterized by high yields and good purity, while at the same time offering substantial economies in operation.

It is also an object of the invention to provide novel azo dyestuffs suitable for coloring cellulose acetate, polyamide fibers and the like.

In accordance with this invention, an N-phenyl pyrrolidine having the formula:

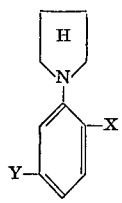

wherein X and Y represent halogen (i.e. Cl, Br) or methyl or lower alkoxy groups of 1–4 carbon atoms is coupled with a diazotized aminobenzene sulfo acid to form an azo compound having the formula:

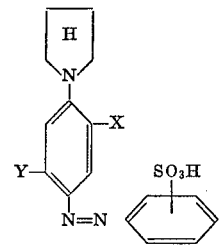

wherein X and Y have the same significance indicated above. The azo compound is reduced—preferably with aqueous alkaline hydrosulfite—whereby the azo linkage is split and its nitrogen atoms are converted to amino groups. The resulting N-(p-aminophenyl) pyrrolidine is recovered—e.g. by extraction from the aqueous reaction mixture with a water-immiscible organic solvent such as benzene, toluene, xylene or the like, and the product removed from the organic solvent solution by extraction with an aqueous acid. The acid salt of the N-(p-aminophenyl) pyrrolidine can be recovered from the aqueous extract by evaporation, or the free base can be liberated by addition of alkali, and a repeated organic solvent extraction, followed by evaporation of the organic solvent from the extract.

N-phenyl pyrrolidines which are suitable as starting materials for use in accordance with this invention are the following:

N-phenyl pyrrolidine
N-(o-tolyl)-pyrrolidine
N-(m-tolyl)-pyrrolidine
N-(2,5-dimethylphenyl)-pyrrolidine
N-(o-methoxyphenyl)-pyrrolidine
N-(m-methoxyphenyl)-pyrrolidine
N-(2-methyl-5-methoxyphenyl)-pyrrolidine
N-(2,5-dimethoxyphenyl)-pyrrolidine
N-(o-ethoxyphenyl)-pyrrolidine
N-(m-ethoxyphenyl)-pyrrolidine
N-(o-propoxyphenyl)-pyrrolidine
N-(o-n-butoxyphenyl)-pyrrolidine
N-(o-tert.-butoxyphenyl)-pyrrolidine
N-(o-chlorophenyl)-pyrrolidine
N-(2,5-dichlorophenyl)-pyrrolidine
N-(o-bromophenyl)-pyrrolidine The aminobenzenesulfo acid employed in preparing the diazo compound for coupling with the N-phenyl pyrrolidine compound can be orthanilic, metanilic or sulfanilic acid.

These are diazotized in the known manner, using alkali nitrite in acid medium or nitrous acid itself, the resulting diazo compound is then coupled with an approximately equimolecular amount of N-aryl-pyrrolidine in aqueous acid solution. Either reactant may be employed in a quantity exceeding an equimolar amount by up to 10%. The azo compound is then precipitated by acidification, and recovered by filtration and washing with cold water.

The azo compound is then reduced to the corresponding amine—preferably by slurrying in alkaline solution, adding sodium hydrosulfite in a quantity advantageously amounting to 10% excess of the reducing agent, and the reaction mixture is then heated. When reduction is complete, the N-(p-aminophenyl) pyrrolidine compound can be extracted with organic solvents as mentioned above and recovered in the form of a salt from the extract by treatment with acidified water.

Conversion of the aminophenyl pyrrolidine compound to the corresponding diazo salt can be carried out without recovery of the base from the aqueous acid salt solution, by treatment with nitrous acid. The resulting diazonium salt is converted to a stable complex by addition of metal chlorides such as zinc, cobalt, stannic, cadmium or ferrous chloride or hydrofluoboric acid and the precipitated complex salt recovered by filtration, washing and drying. The invention will be illustrated by the following examples wherein parts and percentages are by weight unless otherwise indicated.

EXAMPLE 1

173 g. of sulfanilic acid (1 mol) is dissolved in 125 ml. of water to which 135 g. of sodium hydroxide in the form of a 30% aqueous solution have been added. 10 g. of activated charcoal are added, and the solution clarified by filtration. 300 ml. of 20° Bé. hydrochloric acid are added with sufficient ice to reduce the temperature to about 5° C. 181 ml. of aqueous 31.5% sodium nitrite are added over a period of 5 minutes with sufficient ice to maintain the temperature at 5–10° C. The mixture is stirred at the same temperature for an hour, after which excess nitrous acid is removed by adding a small quantity of sulfamic acid.

A solution of 177 g. N-(-tolyl) pyrrolidine in 250 ml. water containing 125 ml. of 20° Bé. hydrochloric acid is added to the solution of diazotized sulfanilic acid. 330 g. of sodium acetate are added over a 5-hour period to maintain the reaction mixture neutral to Congo red. The resulting azo dye is precipitated by acidifying with 100 ml. of 20° Bé. hydrochloric acid after stirring for 16 hours, the product is filtered out and washed with cold water; the azo compound may then be dried. The dyestuff has the formula:

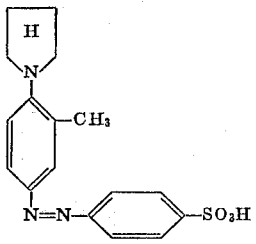

It is suitable as a dyestuff for polyamide fibers. For example, a swatch of nylon fabric (polyhexamethylene adipamide) can be dyed an orange shade by immersion at or near the boil one hour in an aqueous dyebath containing 1% of the azo compound produced as described above and 4% ammonium sulfate, the material being finally rinsed and dried.

Instead of drying, the wet filter cake amounting to 635 g. can be used without drying in preparing the compound N-(p-aminophenyl) pyrrolidine. 254 g. of the wet cake are slurried in 2,000 ml. water and 53 g. of 30° Bé. caustic soda solution are added to render the mixture alkaline to phenolphthalein. A further amount of sodium hydroxide (280 g.) are then added, followed by 184 g. of sodium hydrosulfite, and the reaction mixture is heated to 75° C. After agitating for one hour at 75–80° C. the reduction is complete, and the reaction mixture is cooled to 45° C. and extracted successively with two 300 ml. portions benzene. The benzene extracts are combined and extracted with a solution of 120 ml. of 20° Bé. hydrochloric acid in 600 ml. water. The aqueous extraction is repeated with 200 ml. water containing 20 ml. of hydrochloric acid and the aqueous extracts are combined. The hydrochloride of N-(p-amino-o-methylphenyl) pyrrolidine can be recovered from the resulting aqueous extracts by evaporation.

The aqueous salt solution can be employed directly for preparation of the corresponding diazonium salt. For this purpose, 500 ml. of the salt solution prepared as described above is cooled at 5° C. and diazotization effected at 5–10° C. by addition of 29 ml. of 31.5% aqueous sodium nitrite solution over a period of 15 minutes. Excess nitrous acid is maintained for ten minutes, and then 70 g. of zinc chloride are added over a period of 15 minutes. The complex zinc chloride diazonium double salt crystallizes upon stirring, and after cooling to 0° C., stirring for two hours, and filtering, the double salt recovered as filter cake is air dried. The product has the formula:

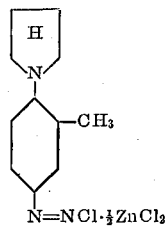

The double salt is an excellent sensitizer for light-sensitive diazotype copying materials.

EXAMPLE 2

In a manner similar to Example 1, the following pyrrolidino benzenes may be reacted with a diazotized aminobenzenesulfo acid to yield monoazo dyes which may then be reduced to produce N-(p-aminophenyl) pyrrolidines. On diazotization of these compounds and conversion to complex diazonium double salts products may be produced which are valuable sensitizers for light-sensitive diazotype copying materials.

| Example | Pyrrolidino benzene | Aminobenzenesulfo acid |
|---|---|---|
| 2 | N-(o-methoxyphenyl) pyrrolidine | Sulfanilic acid. |
| 3 | N-(o-tolyl) pyrrolidine | Metanilic acid. |
| 4 | do | Orthanilic acid. |
| 5 | N-(m-tolyl) pyrrolidine | Sulfanilic acid. |
| 6 | N-(o-chlorophenyl) pyrrolidine | Do. |
| 7 | N-(o-bromophenyl) pyrrolidine | Do. |
| 8 | N-(m-chlorophenyl) pyrrolidine | Do. |
| 9 | N-(2,5-dimethoxyphenyl) pyrrolidine | Do. |
| 10 | N-(2,5-xylyl) pyrrolidine | Do. |

Variations and modifications can be made in the procedure of this invention without departing from the spirit or scope thereof.

We claim:
1. An azo compound having the formula:

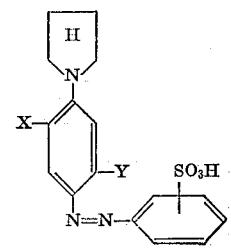

wherein X represents members selected from the group consisting of methyl, alkoxy groups of 1-4 carbon atoms and halogen, and Y represents members selected from the group consisting of hydrogen, chlorine, bromine, methyl and alkoxy groups of 1-4 carbon atoms.

2. An azo compound as defined in claim 1 having the formula:

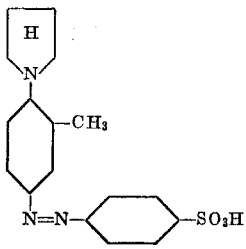

3. An azo compound as defined in claim 1 having the formula:

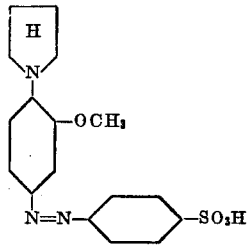

References Cited

UNITED STATES PATENTS 2,804,455  8/1957  Dorlars et al. _____ 260—152

LEWIS GOTTS, Primary Examiner

D. M. PAPUGA, Assistant Examiner

U.S. Cl. X.R.

260—141, 142, 326.85; 96—91 R